United States Patent Office 2,957,891
Patented Oct. 25, 1960

2,957,891

SEPARATION OF PHYTOSTEROL FROM UNSAPONIFIABLES

Thomas S. Burns, Savannah, Ga., and Olin K. McDaniel, Circleville, Ohio, assignors to Union Bag-Camp Paper Corporation, New York, N.Y., a corporation of Virginia No Drawing. Filed Feb. 27, 1957, Ser. No. 642,657

3 Claims. (Cl. 260—397.25)

This invention relates to the treatment of the unsaponifiable matter found in the spent cooking liquors resulting from the manufacture of paper pulp. More particularly it relates to a process for separating phytosterol from the other unsaponifiables.

Sterols, which are particularly valuable as pharmaceutical agents are found in both plants and animals. However, because of the expense and economics involved in producing the sterols from plants, they have heretofore been derived primarily from animals. It is therefore an object of the present invention to provide a less expensive and simplified process for obtaining purified phytosterol.

Another object of the invention is to provide a process to separate phytosterol from the unsaponifiables to obtain the remaining or non-acid fraction, which is rich in lignoceryl and other high alcohols.

A further object of the invention is to provide a process which can be made more selective by proper choice of conditions to separate purified beta-sitosterol from either the starting material or the separated phytosterol.

A further object is to provide a process which is simple, economical and efficient and has definite advantages over the processes and methods heretofore used. Such previous methods for obtaining pure phytosterol from pulp mill by-products have been both lengthy and prohibitively expensive. Multiple extraction using alternate solvents involves numerous steps and the purity of the product obtained is considered inferior to that obtained by the process described herein. Other earlier processes require converting the black liquor soap to crude tall oil, followed by dilution in a solvent plus treatment and handling of the total oil-solvent solution in order to get a crude phytosterol. Processing of this crude material in accordance with these methods requires several successive crystallizations from alcohol in order to achieve a product of acceptable purity. The process described herein has these advantages among others over the prior processes: (1) The amount of material in process, i.e., the unsaponifiable extract is materially less than the whole tall oil, (2) The desired high purity product may be obtained from the crude phytosterol by only one crystallization from a suitable alcohol followed by a simple alcohol wash of the resulting crystals, and (3) The process may be used successfully on unsaponifiable materials obtained by several diverse methods including (*a*) naphtha extraction of black liquor soaps in both isopropanol-water solutions and methanol solutions, (*b*) furfural extraction of the naphtha extracted material such as described in U.S. Patent No. 2,499,403, and (*c*) ester extraction of the black liquor soap in a water solution.

Other objects of the invention will in part be obvious and will in part appear hereinafter.

The invention accordingly comprises several steps and the relation of one or some of such steps with respect to each of the others thereof, which will be exemplified in the process hereinafter disclosed, and the scope of the invention will be indicated in the claims.

In our process the separation and purification of phytosterol is effected essentially by the use of only two crystallization steps. The first step consists of crystallizing crude phytosterol from a petroleum or hydrocarbon solution of the unsaponifiable material under relatively strong acid conditions. The second step consists of purifying the crude phytosterol by crystallization from an alcohol solution at neutral or slightly alkaline conditions. By simply washing the crystalline product, thus obtained, with a small amount of an appropriate alcohol, a pure phytosterol may be obtained. Minor modifications of these steps may be necessary, depending on the method used to obtain the crude unsaponifiable material.

In its broad aspects our process separates phytosterols from the other unsaponifiables in the starting mixture. The process can be made more selective by proper choice of conditions to separate nearly pure beta-sitosterol from either the starting material or the separated phytosterols.

To separate the phytosterol a solution of the unsaponifiable material containing the phytosterol, which may be an extract from black liquor soap, in hydrocarbon solvent is a starting material. Although naphtha has been commonly employed as a solvent, we have shown that other solvents such as heptane, hexane, and pentane are also satisfactory. A ratio of unsaponifiable material to solvent has been used successfully from the low practical limits of 1 to 3/4 up to 1 to 10 on a weight basis, but the upper level probably is limited only by economic considerations. In general low phytosterol content starting materials will require the use of more dilute solutions to achieve the desired degree of purity. With the solution temperature in the range of 30 to 110° F. a quantity of acid usually between 5 and 50% of the weight of the unsaponifiable material is then added. The acid is normally sulfuric, but other acids may be used. When sulfuric acid is used its strength is not critical although 60° Baumé is presently preferred. Upon acidification the crude phytosterol crystallizes and may be removed from solution by filtration, centrifugation, or decantation. For ease of separation we prefer to add a small amount of filter aid to the slurry.

The crystalline crude phytosterol, from this first crystallization, is then dissolved in hot alcohol. Isopropanol is preferred, but other low molecular weight, water soluble alcohols may be used. While hot, this alcoholic solution of impure phytosterol is brought to a pH of 6.0 or greater, with about 7.5 being preferred. Many alkaline materials may be used, with either hydrated lime or liquid caustic soda being preferred. After the pH is adjusted the hot solution is filtered, centrifuged, or decanted in order to remove the products of neutralization and any filter aid. The hot alcohol solution is allowed to cool slowly for crystallization of the phytosterol. The crystals are then separated from the mother liquor by filtration, centrifugation, or decantation and are washed with a small amount of alcohol to remove traces of the mother liquor. The wash may be one of several alcohols, with methanol being preferred, due to its low solubility for phytosterol. However, isopropanol may be used but a greater loss in yield results unless it is cooled below 80° F. The use of this wash is desirable in order to achieve purity without recrystallizations, and its effects may be noted by observing the improvement of the crystals' color, upon application of the wash. The crystals obtained upon drying usually contain in excess of 90 percent sterols by digitonin assay.

It will be recognized by those skilled in the art of crystallization that many variations of conditions for the second crystallization step may be used. Although we have found the limits of the conditions at this step to be quite varied, we have found that a solvent consisting of 75% isopropanol–25% water, by volume is preferable from yield and quality viewpoints. The amount of this solvent used may vary from 10 volumes of solvent per 1 weight of dried, pure phytosterol obtained up to as high a ratio as may be economically feasible. With other solvents, the ratios are of course somewhat different. The amount of alcohol wash applied is usually 10 to 20% of the volume of crystallizing solvent, but may vary considerably from this range depending on the degree of washing required.

As a further refinement of our process, closer control of conditions for the first crystallization, particularly the temperature of crystallization, permit us to separate instead of the phytosterol nearly pure beta-sitosterol. As a general principle the higher the crystallization temperature, the higher will be the beta-sitosterol content of the phytosterol obtained. At temperatures above about 75° F. nearly pure beta-sitosterol is the product. This continues to be true at higher temperatures, except that at the higher temperatures the yield is generally reduced until at a temperature of about 125° F. or above no phytosterol will crystallize. For certain pharmaceutical uses, high purity beta-sitosterol is desired. In such case the melting point of the beta-sitosterol is a criterion and with the refinements of our process we are able to produce beta-sitosterol with a melting point in excess of 138° C. For these same uses brilliant white crystals are also required and our process can be operated to produce crystals having such quality and a high melting point.

As stated before we have used essentially this process to recover pure phytosterol from unsaponifiable material extracted by several means. However, it was found necessary to incorporate certain minor modifications for different materials. Specifically, the naphtha extracted material from a solution of black liquor skimmings in isopropanol-water solution apparently contained an impurity the other extracts did not contain. In order to remove this impurity we found that instead of first acidifying in the hydrocarbon solvent at 80° F., if we first acidified at a temperature approximately 120° F., only this impurity was precipitated. By decanting the clear solution from the precipitate, and cooling to 80° F., the phytosterol would crystallize out and the process could be carried through as described. If additional acid were added after cooling, crystallization yield was improved.

With the exception of slight modifications as in the aforementioned case, we claim the recovery and purification process to be based simply on crystallization from two successive solvents, the first under acid conditions and the second under nearly neutral or alkaline conditions.

In the practice of our invention several examples are described showing the modifications which may be employed. These are considered examples only and by no means intend to limit the extent of the materials used or the modifications possible.

*Example I*

One hundred grams of solid material, extracted with naphtha from a methanol solution of black liquor skimmings and then washed with water, were dissolved in 200 ml. of naphtha. To this solution at 80° F., 9.2 ml. of 78% (60° Baumé) sulfuric acid were added with agitation. This mixture was agitated for 30 minutes to complete crystallization. Six grams of diatomaceous earth were then blended in for filter aid, and the crude phytosterol-filter aid mixture was separated by vacuum filtration. The filter cake was dissolved in 300 ml. of boiling 91% (by volume) isopropanol and hydrated lime was added with agitation until a pH of 7.1 was reached. The filter aid and products of neutralization were removed by vacuum filtration. This cake was washed with 150 ml. of boiling 91% isopropanol and the wash combined with the filtrate. After adjusting the alcohol-phytosterol solution to 400 ml., 85 ml. of hot water were blended in to form a solvent consisting of about 75% isopropanol–25% water. The solution was then cooled slowly to 80° F. and the phytosterol crystals removed by vacuum filtration. While still on the filter, the crystals were washed with 100 ml. of 99% methanol. A yield of 17.0 grams of white phytosterol, melting at 138.5 to 139.0° C. was obtained.

*Example II*

The procedure used in Example I was duplicated in its entirety except 600 ml. of naphtha were used for the first crystallization solvent instead of the 200 ml. used in Example I. A yield of 17.2 grams of white phytosterol, melting at 138.5 to 139.0° C. was obtained.

*Example III*

The procedure used in Example II was duplicated in its entirety except that for the first crystallization 10.9 ml. of 69% (by weight) sulfuric acid were used instead of 9.2 ml. of 78% sulfuric acid as used in Example II. A yield of 15.3 grams of white phytosterol melting at 138.5 to 139.0° C. was obtained.

*Example IV*

Fifty grams of solid material, extracted with isopropyl acetate from a water solution of black liquor skimmings and then washed with water, were dissolved in 200 ml. of naphtha. To this solution, at 80° F., 4.6 ml. of 78% (60° Baumé) sulfuric acid was added with agitation. The mixture was agitated for 30 minutes to complete crystallization. Three grams of diatomaceous earth were blended in for filter aid and the crude phytosterol-filter aid mixture was separated by vacuum filtration. The filter cake was dissolved in 136 ml. of boiling 91% isopropanol and hydrated lime was added with agitation until a pH of approximately 7.0 was reached. The filter aid and products of neutralization were removed by vacuum filtration. This cake was washed with 35 ml. of boiling 91% isopropanol and the wash combined with the filtrate. After adjusting the alcohol-phytosterol solution to 110 ml., 21 ml. of hot water were blended in. The solution was cooled slowly to 80° F. and the phytosterol crystals removed by vacuum filtration. While still on the filter, the crystals were washed with 50 ml. of 99% methanol. A yield of 6.3 grams of white phytosterol melting at 139.0–139.5° C. was obtained.

*Example V*

One hundred grams of solid material, extracted with naphtha from an isopropanol-water solution of black liquor skimmings, were dissolved in 400 ml. of naphtha. To this solution, at 125° F., 6.2 ml. of 60° Baumé sulfuric acid were added with agitation. The precipitated material was allowed to settle and the clear solution decanted. After cooling the solution to 80° F. for crystallization, complete crystallization was insured by further adding 3.1 ml. of 60° Baumé sulfuric acid. Six grams of diatomaceous earth were added and the slurry filtered. The filter cake was dissolved in 200 ml. of boiling 75% (by volume) isopropanol and liquid caustic soda (50% strength) was added with agitation until the pH of 8 was reached. The filter aid and products of neutralization were removed by filtration while hot, and the spent caustic layer was withdrawn. The alcohol-phytosterol solution was cooled slowly to 80° F. and the phytosterol crystals were removed by vacuum filtration. While still on the filter, the crystals were washed with 50 ml. of 99% methanol. A yield of 13.0 grams of white phytosterol, melting at 139.5 to 140.0° C. was obtained.

Example VI

The procedure used in Example V was duplicated in its entirety except that heptane was used as the first crystallization solvent instead of naphtha. A yield of 16.8 grams of white phytosterol, melting at 139.0 to 139.5° C., was obtained.

Example VII

Thirty grams of solid material obtained by the following process were used. The process was a triple extraction which consisted firstly of extracting with naphtha the black liquor skimmings in a water-methanol solution, secondly extracting the first extract with furfural, and thirdly extracting the second extract with naphtha. The thirty grams of solids thus obtained were dissolved in 400 ml. of naphtha and 9.3 ml. of 60° Baumé sulfuric acid were added at 80° F. Six grams of filter aid were added and the slurry was filtered. The filter cake was dissolved in 165 ml. of boiling 91% isopropanol and hydrated lime was added with agitation until a pH of about 7.0 was reached. The solids were filtered off while hot and the cake was washed with 35 ml. of boiling 91% isopropanol. The filtrate and wash were combined and 42 ml. of hot water were blended in. The crystallizing, filtering, and washing of the crystals was done as described in the previous example. A yield of 10.3 grams of white phytosterol, melting at 138.5 to 139.0° C., was obtained.

Example VIII

The procedure used in Example II was duplicated in its entirety except that the naphtha solution temperature was 60° F. instead of 80° F. used in Example II. A yield of 20.3 grams of white phytosterol, melting at 131.0 to 133.0° C., was obtained.

Example IX

Fifty grams of solid material, extracted with naphtha from a methanol solution of black liquor skimmings, were dissolved in 200 ml. of naphtha. To this solution, at 50° F., 4.6 ml. of 60° Baumé sulfuric acid were added with agitation. The mixture was agitated for 30 minutes at 50° F. to complete crystallization. Three grams of diatomaceous earth were then blended in for filter aid. The crude phytosterol-filter aid mixture was separated by vacuum filtration. The filter cake was dissolved in 200 ml. of boiling 91% (by volume) isopropanol and hydrated lime was added with agitation until a pH of 7.0 was reached. The filter aid and products of neutralization were removed by vacuum filtration. This cake was washed with 100 ml. of boiling 91% isopropanol and the wash combined with the filtrate. After adjusting the alcohol-phytosterol solution to 300 ml., 64 ml. of hot water were blended in. The solution was then cooled slowly to 80° F. and the phytosterol crystals removed by vacuum filtration. While still on the filter, the crystals were washed with 100 ml. of 99% methanol. A yield of 10.8 grams of white phytosterol, melting at 127° C. was obtained.

Example X

One hundred grams of solid material, extracted with naphtha from a methanol solution of black liquid skimmings, were dissolved in 1000 ml. of naphtha. To this solution, at 40° F., 19.7 ml. of 60° Baumé sulfuric acid were added with agitation. This mixture was agitated for 30 minutes at 40° F. to complete crystallization. Six grams of diatomaceous earth were then blended in for filter aid, and the crude phytosterol-filter aid mixture was separated by vacuum filtration. The filter cake was dissolved in 300 ml. of boiling 99% (by volume) isopropanol and hydrated lime was added with agitation until a pH of 7.0 was reached. The filter aid and products of neutralization were removed by vacuum filtration. This cake was washed with 150 ml. of boiling 99% isopropanol and the wash combined with the filtrate. After adjusting the alcohol-phytosterol solution to 400 ml., 100 ml. of hot water were blended in. The solution was then cooled slowly to 80° F. and the phytosterol crystals were washed with 200 ml. of 99% methanol. A yield of 20.4 grams of a white phytosterol, melting at 129.0 to 131.0° C. was obtained.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for separating and purifying phytosterol from the unsaponifiable non-acid fraction of black liquor skimmings which is recovered by hydrocarbon solvent extraction of said skimmings, consisting of adding an amount of about 5 to about 50% of mineral acid to a hydrocarbon solution of said unsaponifiable non-acid fraction based upon the weight of said fraction, the ratio of unsaponifiable material to said hydrocarbon solvent varying between 1 to 3 to 1 to 10 and crystallizing crude phytosterol at a temperature to between about 75° F. and about 125° F., separating said phytosterol from the acidified solution, dissolving said crude phytosterol in a low molecular weight monohydric aliphatic water soluble alcohol at elevated temperature, neutralizing the hot solution with an alkaline material selected from the group consisting of hydrated lime and caustic soda and adjusting the pH to neutral to alkaline condition, separating precipitated impurities from said solution to a temperature below 80° F. crystallizing substantially pure phytosterol, separating crystals of said phytosterol and washing said crystals with an alcohol selected from the group consisting of methanol and isopropanol.

2. A process as claimed in claim 1 wherein said mineral acid is sulfuric acid.

3. A process as claimed in claim 2 wherein said monohydric alcohol is isopropanol and said alcohol for washing is methanol.

References Cited in the file of this patent

UNITED STATES PATENTS

| | | |
|---|---|---|
| 2,248,346 | Gayer et al. | July 8, 1941 |
| 2,273,045 | Julian et al. | Feb. 17, 1942 |
| 2,530,810 | Christenson et al. | Nov. 21, 1950 |
| 2,585,954 | Mattikow | Feb. 19, 1952 |